(12) United States Patent
Kokubo

(10) Patent No.: US 9,880,912 B2
(45) Date of Patent: Jan. 30, 2018

(54) INFORMATION PROCESSING SYSTEM, CONTROL METHOD OF INFORMATION PROCESSING SYSTEM, AND NON-TRANSITORY COMPUTER-READABLE STORAGE MEDIUM

(71) Applicant: FUJITSU LIMITED, Kawasaki-shi, Kanagawa (JP)

(72) Inventor: Ryosuke Kokubo, Kannami (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 14/334,733

(22) Filed: Jul. 18, 2014

(65) Prior Publication Data

US 2015/0052384 A1    Feb. 19, 2015

(30) Foreign Application Priority Data

Aug. 16, 2013  (JP) ................ 2013-169188

(51) Int. Cl.
G06F 11/00      (2006.01)
G06F 11/20      (2006.01)
G06F 11/30      (2006.01)

(52) U.S. Cl.
CPC ...... *G06F 11/2028* (2013.01); *G06F 11/2038* (2013.01); *G06F 11/2048* (2013.01); *G06F 11/3048* (2013.01); *G06F 11/3089* (2013.01)

(58) Field of Classification Search
CPC ............. G06F 11/2028; G06F 11/2038; G06F 11/2048; G06F 11/3048; G06F 11/3089; G06F 11/3466; G06F 11/2069
See application file for complete search history.

(56) References Cited

U.S. PATENT DOCUMENTS

2003/0126240 A1*  7/2003  Vosseler ............. G06F 11/0709
                                                          709/221
2007/0067773 A1*  3/2007  Hope .................... G06F 9/542
                                                          718/100

FOREIGN PATENT DOCUMENTS

| JP | 61-221542   | 10/1986 |
| JP | 04-319900   | 11/1992 |
| JP | 7-319836    | 12/1995 |
| JP | 9-83641     | 3/1997  |
| JP | 2004-015440 | 1/2004  |
| JP | 2008-015722 | 1/2008  |
| JP | 2010-282521 | 12/2010 |

OTHER PUBLICATIONS

Japanese Office Action dated Mar. 28, 2017 corresponding to Japanese Patent Application No. 2013-169188.

* cited by examiner

*Primary Examiner* — Bryce Bonzo
*Assistant Examiner* — Katherine Lin
(74) *Attorney, Agent, or Firm* — Staas & Halsey LLP

(57) ABSTRACT

The information processing system includes a first management device, a second management device coupled to the first management device, and a first information processing device coupled to the second management device, wherein the second management device receives, from the first information processing device, a notification indicating that an operation state of the first information processing device is changed from a first state to a second state, and the second management device transmits the notification to the first management device after a first time period is collapsed after receiving the notification, the first time period being defined based on the second state.

19 Claims, 19 Drawing Sheets

FIG. 7

```
SERVICE MONITORING{
  TARGET=FILE SERVER
  Run = 30sec
  Failover=3sec
  Double=3sec
}
```

FIG. 8

```
SERVICE MONITORING{
  TARGET=CALCULATION SERVER
  Run = 60sec
  Failover=-
  Double=-
}
```

FIG. 9

```
SERVICE MONITORING{
  TARGET=MANAGEMENT SERVER
  Run = 60sec
  Failover=3sec
  Double=-
}
```

FIG. 10

```
SERVICE MONITORING{
  TARGET= CALCULATION SERVER
  Run = 60sec
  Failover=-
  Double=-
}
SERVICE MONITORING{
  TARGET= CALCULATION SERVER
  Run = 60sec
  Failover=3sec
  Double=-
}
```

FIG. 11

```
SERVICE MONITORING{
  TARGET=FILE SERVER
  Run = 30sec
  Failover=3sec
  Double=3sec
}
SERVICE MONITORING{
  TARGET= CALCULATION SERVER
  Run = 60sec
  Failover=-
  Double=-
}
SERVICE MONITORING{
  TARGET= CALCULATION SERVER
  Run = 60sec
  Failover=3sec
  Double=-
}
```

FIG. 12

```
STATE TRANSITION NOTIFICATION CACHE TIME{
  DETECTION SOURCE TYPE=FILE SERVER
  Run = 10sec
  Down = 5sec
  Failover=0sec
  Double=0sec
}
STATE TRANSITION NOTIFICATION CACHE TIME{
  DETECTION SOURCE TYPE=CALCULATION SERVER
  Run = 30sec
  Down = 10sec
  Failover=-
  Double=-
}
STATE TRANSITION NOTIFICATION CACHE TIME{
  DETECTION SOURCE TYPE=MANAGEMENT SERVER
  Run = 20sec
  Down = 5sec
  Failover = 0sec
  Double=-
}
```

INFORMATION PROCESSING SYSTEM, CONTROL METHOD OF INFORMATION PROCESSING SYSTEM, AND NON-TRANSITORY COMPUTER-READABLE STORAGE MEDIUM

CROSS-REFERENCE TO RELATED APPLICATION

This application is based upon and claims the benefit of priority from the prior Japanese Patent Application No. 2013-169188 filed on Aug. 16, 2013, the entire contents of which are incorporated herein by reference.

FIELD

The embodiments discussed herein are related to an information processing system, a control method of the information processing system, and a non-transitory computer-readable storage medium.

BACKGROUND

In a high performance computing (HPC) system that executes recent advanced scientific computing, a demand has been increased year by year that a large number of calculation servers is managed and operated in parallel as compared with a technology in a related art, due to a request for calculation processing performance of the whole system.

In the HPC system that includes such a large number of servers, it is desirable that a halting time of the system is reduced, and a running time is increased. Thus, a system with high availability is employed in which a main server such as a file server employs a redundant structure, and switching from an operation system to a standby system is performed when abnormality occurs, and a continued operation is allowed. The switching from the operation system to the standby system is called failover.

On the other hand, in order to increase the performance in the HPC system, the number of calculation servers that execute calculation processing is also increased proportionally, so that reduction in a communication load is desired in a network within the system. In the HPC system, for example, 80000 calculation servers may be included.

Therefore, in the related art, system monitoring is performed using a layer structure in order to monitor the state of a server group that includes a calculation server and a file server of a large-scale HPC system.

For example, as illustrated in FIG. 1, a monitoring master server that monitors the whole system is provided, for example, on the top layer in a layer structure such as a tree structure, and a plurality of monitoring sub-master servers that are management repeaters is provided on the second layer, a plurality of servers that are monitored, that is, a file server and a calculation server in the example of FIG. 1 are provided on the lowest layer. That is, the monitoring master server monitors the plurality of monitoring sub-master servers, and the monitoring sub-master servers monitor the calculation server and the file server that are monitored servers under the control of the monitoring sub-master servers. In the example of FIG. 1, a file server A and a file server B correspond to a failover pair.

In the example of FIG. 1, for example, each of the calculation server and the file server that are monitored servers includes a service monitoring daemon that monitors service in the server, for example, service for job operation at certain intervals, for example, 60 second intervals. For example, when abnormality occurs in the file server A, the file server A transmits state change notification that is used to notify the monitoring sub-master server of a state change of the file server A to a down state due to the occurrence of the abnormality, at a next monitoring timing (FIG. 2: 1000). The monitoring sub-master server does not immediately transfer the state change notification to the monitoring master server, but holds the state change notification in the monitoring sub-master server for a certain time period, for example, for 30 seconds (FIG. 2: 1010). The holding of the state change notification for the certain time period is called "cache". In addition, such cache is also called "state change notification cache".

The state change notification cache is a technology to cache the state change notification for the certain time period and reduce a network load because a load is applied to the network when packets for the state change notification are transmitted and received to and from a server in a upper layer and a server in a lower layer in the layer structure such as the tree structure of the large scale HPC system when start-up at the same time and shutdown at the same time are performed in the system.

After the certain time period elapses, the monitoring sub-master server transmits the cache state change notification that is used to notify the other servers of the state change of the file server A, to the monitoring master server (FIG. 2: 1020). The monitoring master server does not immediately execute processing even after the monitoring master server receives the state change notification, and caches the state change notification for a certain time period, for example, for 30 seconds (FIG. 2: 1030). After the certain time period elapses, the monitoring master server transmits the state change notification to the two monitoring sub-master servers (FIG. 2: 1040).

The monitoring sub-master server does not immediately execute processing even after the monitoring sub-master server receives the state change notification, and caches the state change notification in the monitoring sub-master server for a certain time period, for example, for 30 seconds (FIG. 2: 1050). After the certain time period elapses, the monitoring sub-master server transmits the state change notification to the monitored servers other than the file server A (FIG. 2: 1060 and 1070).

In the example of FIG. 2, when the file server B that is paired with the file server A as the failover pair receives the state change notification, the file server B starts failover at the point of 150 seconds, but the file server B detects a state that is failover due to the state change notification merely at a next monitoring timing, that is, after 30 seconds. After that, it takes the same time to perform propagation of the state change notification of "failover", and propagation of the state change notification from "failover" to "double" (service biased state). That is, it takes about 390 seconds to complete switching of the file server.

As described above, in the switching processing of the server, it takes a long time due to the monitoring time interval in each of the monitored servers and the state change notification cache, so that, as a result, an operation halting time is increased regardless of important state change.

There is a technology by which a monitoring time interval of a monitored device by a monitoring device is dynamically changed, and the monitoring device instructs the monitored device to change the monitoring time interval, but a large management load is applied to the monitoring device.

The technologies in the related art are discussed in Japanese Laid-open Patent Publication No. 61-221542 and Japanese Laid-open Patent Publication No. 9-83641.

SUMMARY

According to an aspect of the invention, an information processing system includes a first management device, a second management device coupled to the first management device, and a first information processing device coupled to the second management device, wherein the second management device receives, from the first information processing device, a notification indicating that an operation state of the first information processing device is changed from a first state to a second state, and the second management device transmits the notification to the first management device after a first time period is collapsed after receiving the notification, the first time period being defined based on the second state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of setting data that is related to a monitoring interval in a file server;

FIG. 8 is a diagram illustrating an example of setting data that is related to a monitoring interval in a calculation server;

FIG. 9 is a diagram illustrating an example of setting data that is related to a monitoring interval in a management server;

FIG. 10 is a diagram illustrating an example of setting data that is related to a monitoring interval, which is stored in the monitoring sub-master server;

FIG. 11 is a diagram illustrating an example of setting data that is related to a monitoring interval, which is stored in the monitoring master server;

FIG. 12 is a diagram illustrating an example of setting data that is related to a cache time, which is stored in the monitoring master server and the monitoring sub-master server;

DESCRIPTION OF EMBODIMENTS

In the embodiments, a technology is discussed by which state change in an information processing device that is included in an information processing system is notified flexibly based on the state change.

First Embodiment

Figure 1:
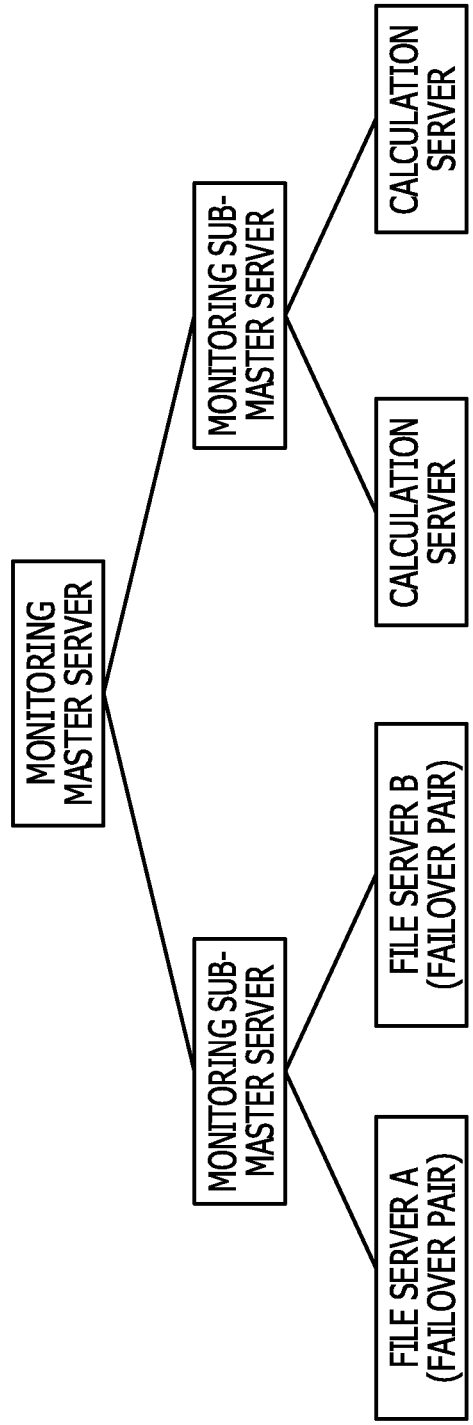
FIG. 1 is a diagram illustrating a system structure example.
Figure 2:
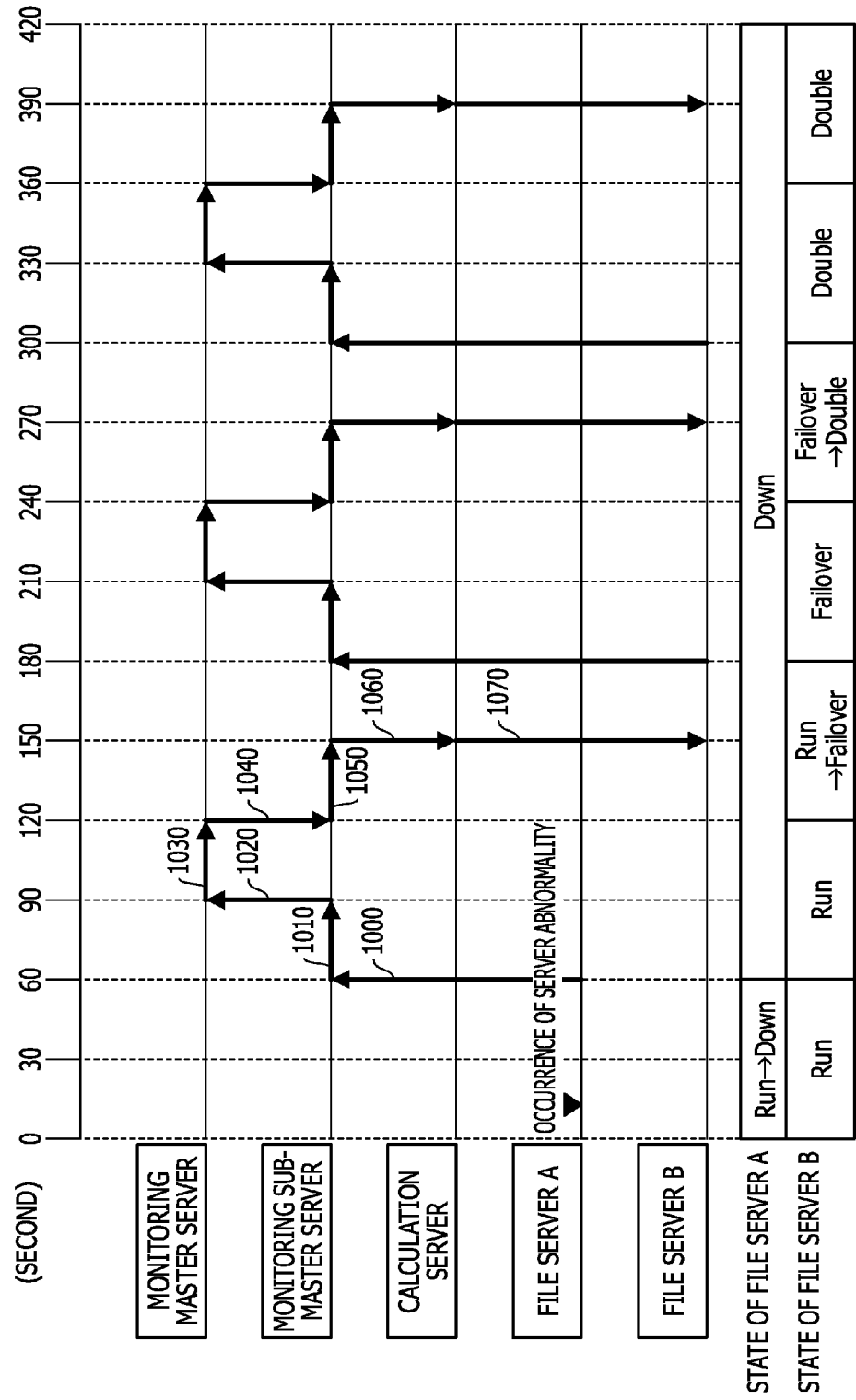
FIG. 2 is a diagram illustrating distribution of state change notification.
Figure 3:
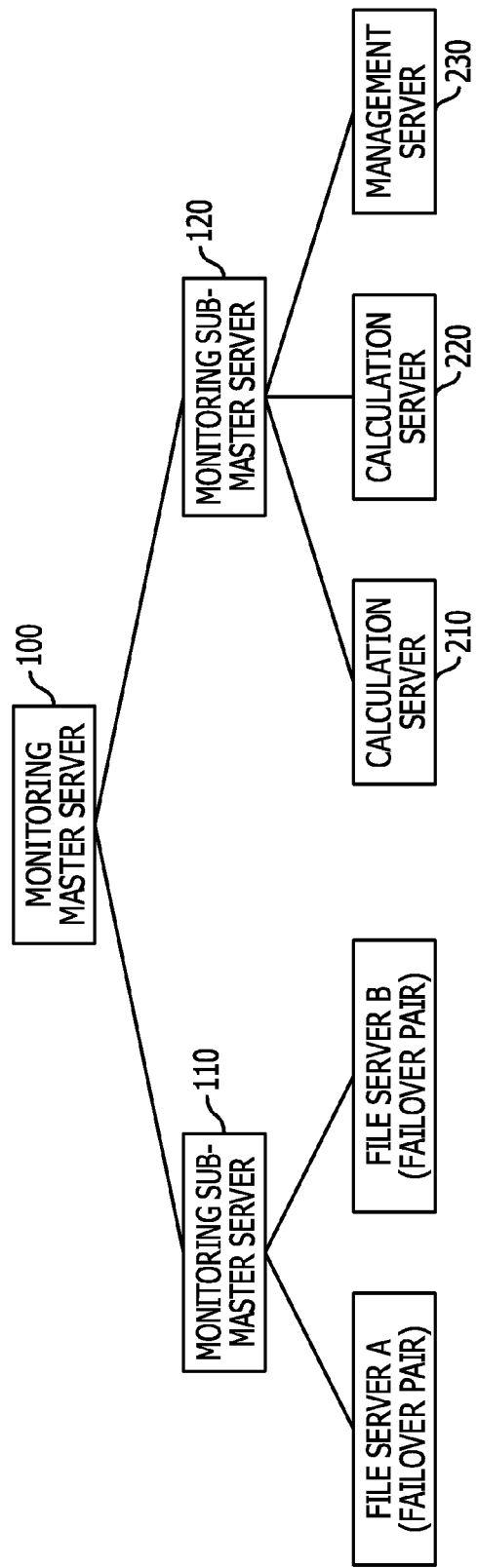
FIG. 3 is a diagram illustrating a system structure example according to a first embodiment.

FIG. 3 is a diagram illustrating a structure example of an information processing system according to a first embodiment. The information processing system includes a monitoring master server 100, monitoring sub-master servers 110 and 120, file servers A and B that correspond to a failover pair, calculation servers 210 and 220, and a management server 230.

In addition, the information processing system has a logical layer structure, and includes the monitoring master server 100 as the top layer, the monitoring sub-master servers 110 and 120 as the intermediate layer, and the file servers A and B, the calculation servers 210 and 220, and the management server 230 as monitored servers of the lowest layer. However, the intermediate layer may include a plurality of layers.

The file servers A and B manage files that are used by the calculation servers 210 and 220 and the like. The calculation servers 210 and 220 execute instructed calculation processing. The management server 230 executes processing of managing the calculation servers 210 and 220, and the file servers A and B.

The number of monitored servers and the number of monitoring sub-master servers are examples, and the embodiment is not limited to the illustrated number of servers. In particular, a plurality of management servers is provided as the management server 230 when failover is performed.

Figure 4:
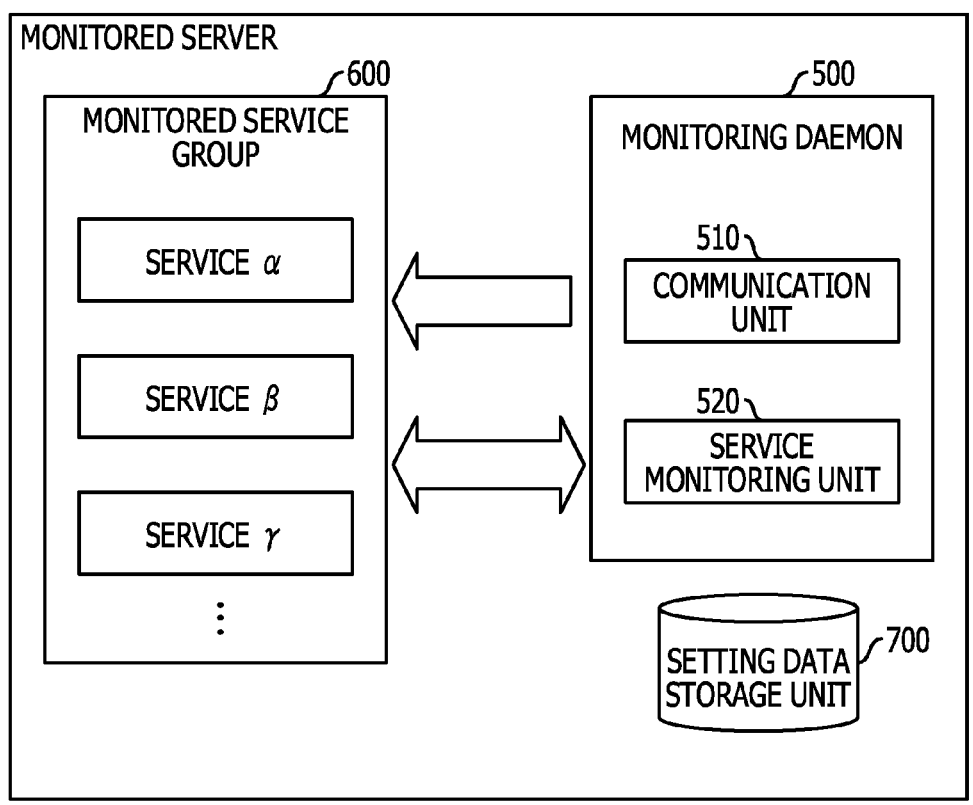
FIG. 4 is a diagram illustrating a structural example of a monitored server.

FIG. 4 illustrates a structure example of the monitored server such as the file server A or B, the calculation server 210 or 220, or the management server 230 illustrated in FIG. 3.

As illustrated in FIG. 4, the monitored server includes a monitoring daemon 500, a monitored service group 600, and a setting data storage unit 700. Here, the monitored service group 600 includes pieces of service a to y, and each of the pieces of service executes processing for job, which is defined beforehand. On the other hand, the monitoring daemon 500 includes a communication unit 510 and a service monitoring unit 520.

The communication unit 510 executes processing of transmitting state change notification that is used to notify the other servers of the state change based on abnormality that occurs in service, and notifying related service of state change notification and the like from the other servers. The service monitoring unit 520 monitors each of the pieces of service that are included in the monitored service group 600, at monitoring intervals using setting data that is stored in the setting data storage unit 700, and causes the communication unit 510 to transmit state change notification that is used to notify the other servers of state change based on abnormality when the abnormality is detected.

Figure 5:
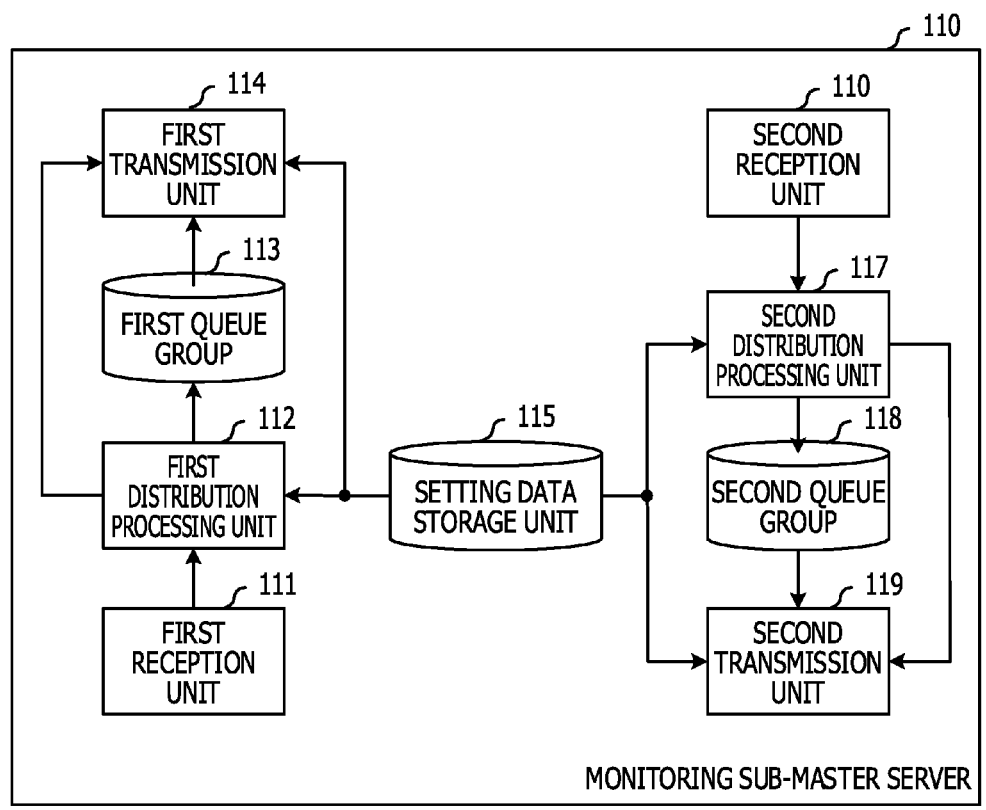
FIG. 5 is a diagram illustrating a structural example of a monitoring sub-master server.

A structure example of a monitoring sub-master server 110 is illustrated in FIG. 5. The monitoring sub-master server 110 includes a first reception unit 111, a first distribution processing unit 112, a first queue group 113, a first transmission unit 114, a setting data storage unit 115, a second reception unit 116, a second distribution processing unit 117, a second queue group 118, and a second transmission unit 119.

The first reception unit 111 receives state change notification from the monitored server under the control of the first reception unit 111, and outputs the state change notification to the first distribution processing unit 112. The first distribution processing unit 112 stores the state change notification in a corresponding queue of the first queue group 113 in accordance with data that is stored in the setting data storage unit 115. The first transmission unit 114 transmits the state change notification that is stored in each of the queues to the monitoring master server 100, at the intervals that are identified in accordance with the data that is stored in the setting data storage unit 115.

The second reception unit 116 receives state change notification from the monitoring master server 100, and outputs the received state change notification to the second distribution processing unit 117. The second distribution processing unit 117 stores the state change notification in a corresponding queue of the second queue group 118 in accordance with the data that is stored in the setting data storage unit 115. The second transmission unit 119 transmits the state change notification that is stored in each of the queues, to a corresponding monitored server, at the intervals that are identified in accordance with the data that is stored in the setting data storage unit 115.

Figure 6:
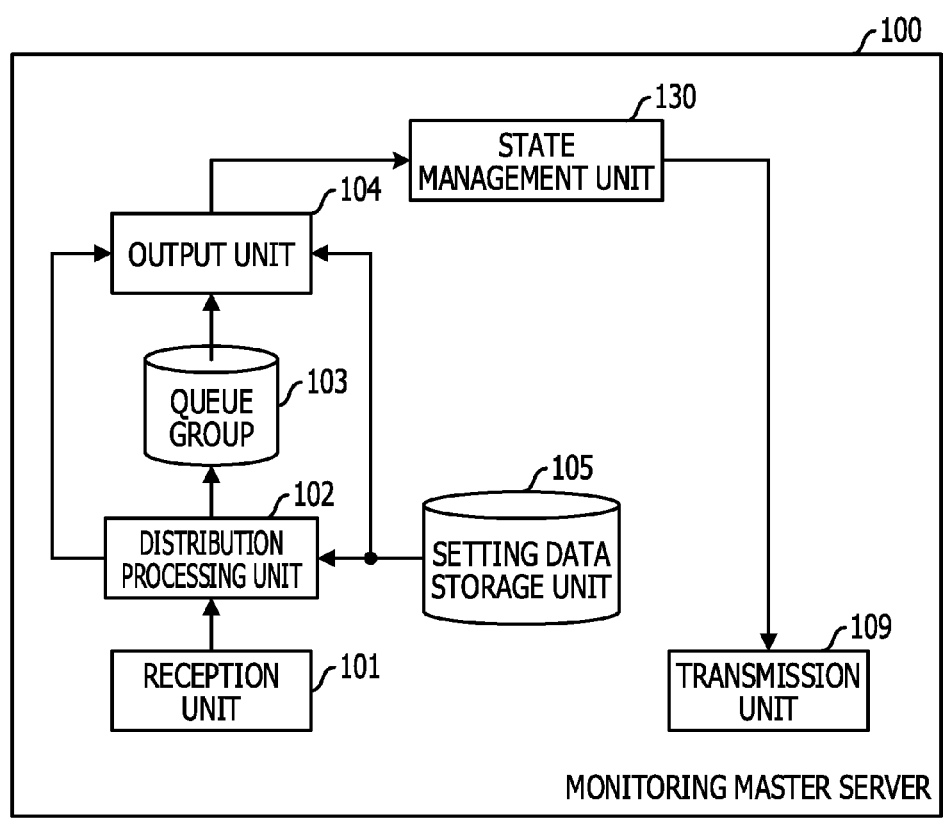
FIG. 6 is a diagram illustrating a structural example of a monitoring master server.

A structure example of the monitoring master server 100 is illustrated in FIG. 6. The monitoring master server 100 includes a reception unit 101, a distribution processing unit 102, a queue group 103, an output unit 104, a setting data storage unit 105, a transmission unit 109, and a state management unit 130.

The reception unit 101 receives state change notification from the monitoring sub-master server 110 or 120 under the control of the reception unit 101, and outputs the received the state change notification to the distribution processing unit 102. The distribution processing unit 102 stores the state change notification in a corresponding queue of the queue group 103 in accordance with data that is stored in the setting data storage unit 105. The output unit 104 transmits the state change notification that is stored in each of the queues, to the state management unit 130, at intervals that are identified in accordance with the data that is stored in the setting data storage unit 105. The state management unit 130 executes processing that is defined depending on state change notification. The state management unit 130 also executes processing of distributing the state change notification, to the monitored server and the like the state of which is a state other than a down state, that is, a termination state. In this case, the state management unit 130 outputs the state change notification to the transmission unit 109. Processing other than such processing of the state management unit 130 is not related to the embodiment, and the description is not made herein.

The transmission unit 109 transmits state change notification to the corresponding monitoring sub-master servers 110 and 120.

Data that is stored in the setting data storage unit 700 that is included in the monitored server is described below.

In the embodiment, a different monitoring interval is automatically employed depending on the type of the monitored server and a detected state after change.

That is, in the setting data storage unit 700 of each of the file servers A and B, for example, data as illustrated in FIG. 7 is stored. In the example of FIG. 7, it is defined that the monitoring interval corresponds to 30 seconds in a normal execution state "Run", and the monitoring interval corresponds to 3 seconds in a failover state "Failover", and the monitoring interval corresponds to 3 seconds in a biased state "Double". That is, when the state transitions to the failover state or the biased state for any reason, the monitoring interval is reduced in order to handle an occurring problem early. When the state transitions to the down state, monitoring is not performed, so that the monitoring interval is not defined.

In addition, in the setting data storage unit 700 of each of the calculation servers 210 and 220, for example, data as illustrated in FIG. 8 is stored. In the example of FIG. 8, it is defined that, the monitoring interval corresponds to 60 seconds in the normal execution state "Run". In the calculation servers 210 and 220, the other state corresponds to merely the down state, so that monitoring is not performed as long as the state is the down state, and the monitoring interval is not defined.

In addition, in the setting data storage unit 700 of the management server 230, for example, data as illustrated in FIG. 9 is stored. In the example of FIG. 9, it is defined that, the monitoring interval corresponds to 60 seconds in the normal execution state "Run", and the monitoring interval corresponds to 3 seconds in the failover state "Failover". In the management server 230, there is not biased state "Double", the monitoring interval is not defined. In addition, monitoring is not performed as long as the state is the down state, so that the monitoring interval is not defined.

In the setting data storage unit 115 of each of the monitoring sub-master servers 110 and 120, data in accordance with the type of the monitored server under the control of the monitoring sub-master server is stored. That is, under the control of the monitoring sub-master server 110, merely the file server exist, so that the data as illustrated in FIG. 7 is stored in the setting data storage unit 115. In addition, under the control of the monitoring sub-master server 120, the calculation servers and the management server exist, so that data as illustrated in FIG. 10 is stored in the setting data storage unit 115, and more specifically, the pieces of data as illustrated in FIG. 8 and FIG. 9 are stored in the setting data storage unit 115. When each of the monitoring sub-master servers 110 and 120 includes a file server function, a calculation server function, and a management server function as well, data of a monitoring time in accordance with such a function is also stored in the setting data storage unit 115.

In addition, in the setting data storage unit 105 of the monitoring master server 100, data in accordance with the type of the monitored server under the control of the monitoring master server 100 is stored. In this example, as illustrated in FIG. 11, definition of monitoring times for the file server, the calculation server, and the management server is included.

There is a case in which distribution of such data from the monitoring master server 100 to the server under the control of the monitoring master server 100 is performed.

In addition, in the embodiment, a cache time of state change notification is changed dynamically and automatically based on the detection source server type of state change and the state after change.

Therefore, in the setting data storage unit 115 of each of the monitoring sub-master servers 110 and 120, data of the cache time is also stored. In addition, in the setting data storage unit 105 of the monitoring master server 100, similar data of the cache time is stored.

That is, as illustrated in FIG. 12, data is stored that indicates that state change notification is cached for 10 seconds at maximum when the state after change, which is notified from the file server, is "Run", and state change notification is cached for 5 seconds at maximum when the state after change is "Down", and state change notification is cached for 0 second, that is, caching is not performed when the state after change is "Failover" or "Double".

In addition, data is stored that indicates that state change notification is cached for 30 seconds at maximum when the state after change, which is notified from the calculation server, is "Run", and state change notification is cached for 10 seconds at maximum when the state after change is "Down". A state other than such states is not notified, so that the cache time is not defined for the state. In addition, data is stored that indicates that state change notification is cached for 20 seconds at maximum when the state after change, which is notified from the management server, is "Run", and state change notification is cached for 5 seconds at maximum when the state after change is "Down", and state change notification is cached for 0 second, that is, caching is not performed when the state after change is "Failover".

An operation of each of the servers is described below with reference to FIGS. 13 to 16.

Figure 13:
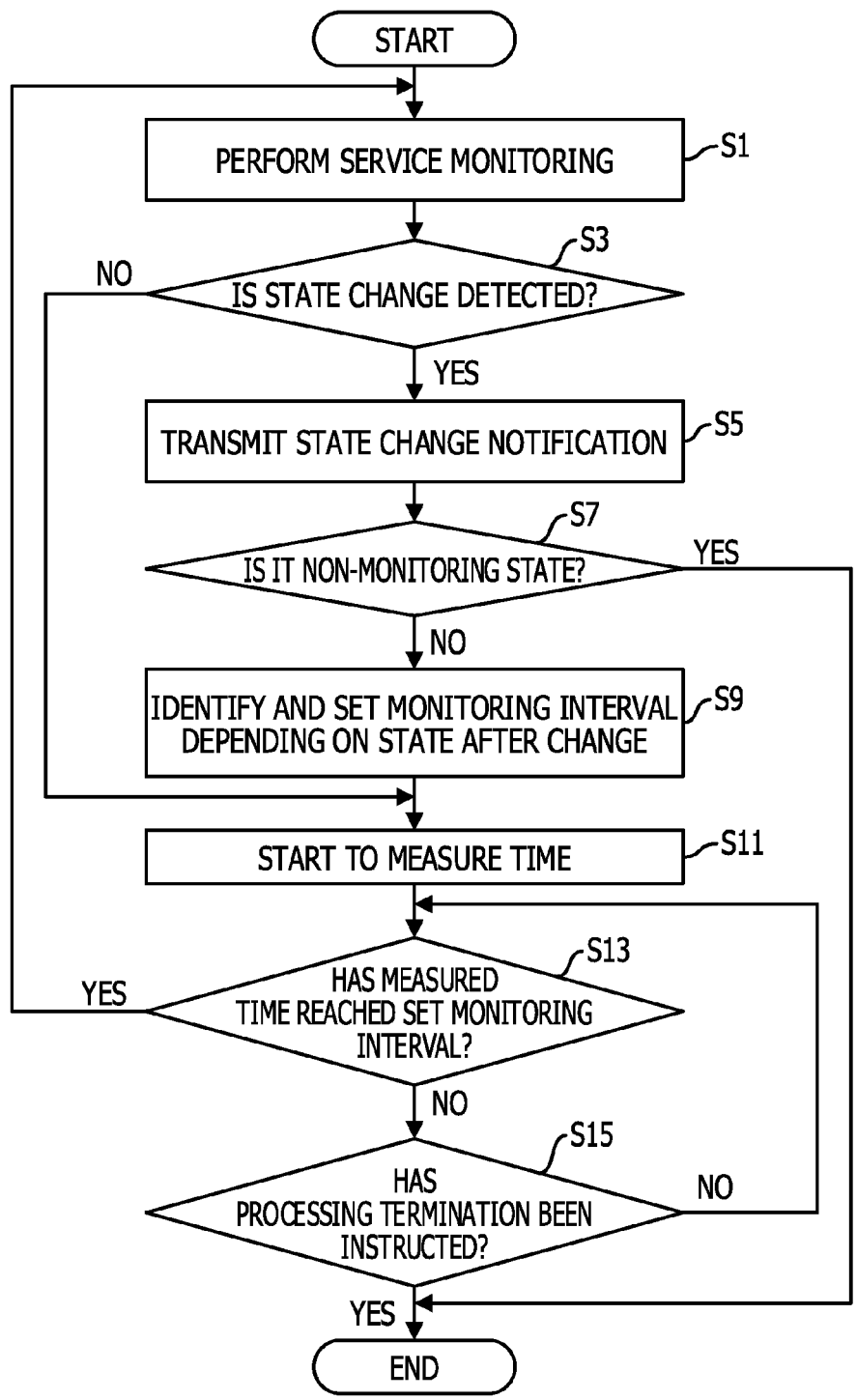
FIG. 13 is a diagram illustrating a processing flow in the monitored server.

First, processing in each of the monitored servers is described with reference to FIG. 13.

The service monitoring unit 520 in the monitoring daemon 500 performs monitoring for each of the pieces of service that are included in the monitored service group 600 (Step S1). For example, the service monitoring unit 520 detects the present or absent of occurrence of abnormality or the current state. After that, the service monitoring unit 520 determines whether or not state change from the previous state is detected (Step S3). When the service monitoring unit 520 determines that state change is not detected, the processing proceeds to Step S11. That is, the service monitoring unit 520 starts to measure a time (Step S11). It is assumed that state change is detected initially.

On the other hand, when the service monitoring unit 520 determines that state change is detected, the service monitoring unit 520 causes the communication unit 510 to transmit state change notification that includes pieces of data of a detection source server identifier, a detection source server type, and a state after change, to the monitoring server in the upper level, that is, the monitoring sub-master server 110 or 120 (Step S5).

Here, when the state after change is the down state "Down", monitoring is not performed after that. Thus, the service monitoring unit 520 determines whether or not the state after change is a non-monitoring state that is set beforehand such as the down state (Step S7). When the service monitoring unit 520 determines whether that the state after change is the non-monitoring state, the processing ends.

On the other hand, when the service monitoring unit 520 determines whether that the state after change is not the non-monitoring state, the service monitoring unit 520 identifies a monitoring interval depending on the state after change from data of the setting data storage unit 700, and performs setting of the monitoring interval (Step S9). When the failover state is detected in the file server A or B, the monitoring interval corresponds to 3 seconds as illustrated in FIG. 7.

In addition, the service monitoring unit 520 starts to measure a time (Step S11). After that, the service monitoring unit 520 determines whether or not the measured time has reached the set monitoring interval (Step S13). When the service monitoring unit 520 determines that the measured time has not reached monitoring interval, the service monitoring unit 520 determines whether or not processing termination has been instructed (Step S15). When the service monitoring unit 520 determines the processing termination has been instructed, the processing ends. On the other hand, when the service monitoring unit 520 determines the processing termination has not been instructed, the processing returns to Step S13.

On the other hand, when the service monitoring unit 520 determines that the measured time has reached the set monitoring interval, the processing returns to Step S1.

By executing the above-described processing, a monitoring interval may be reduced when state change to a state having high importance of service monitoring is detected, and a monitoring time period may be increased when state change to a state having not high importance of service monitoring is detected. That is, state change may be detected at intervals depending on an importance degree of a state.

The content of processing in each of the monitoring sub-master servers 110 and 120 is described below with reference to FIG. 14.

When the first reception unit 111 receives state change notification from the monitored server under the control of each of the monitoring sub-master servers 110 and 120 (Step S21), the first reception unit 111 outputs the state change notification to the first distribution processing unit 112. The first distribution processing unit 112 extracts a detection source server type and a state after change from the state change notification (Step S23), and identifies a cache time that is defined for the detection source server type and the state after change, from the data that is stored in the setting data storage unit 115 (Step S25).

In addition, the first distribution processing unit 112 determines whether or not the cache time is 0 second (Step S27). When the first distribution processing unit 112 determines that the cache time is 0 second, the state change notification is transmitted without caching, so that the first distribution processing unit 112 outputs the received state change notification to the first transmission unit 114.

The first transmission unit 114 transmits the state change notification to the monitoring master server 100 (Step S29). As a result, important state change notification is immediately transmitted to the monitoring master server 100.

On the other hand, the first distribution processing unit 112 determines that the cache time is not 0 second, the first distribution processing unit 112 stores the state change notification in a queue for the identified cache time in the first queue group 113 (Step S31). Under the control of the monitoring sub-master server 110, merely the file servers A and B exist, so that the cache time corresponds to one of 10 second, 5 seconds, and 0 second. Thus, the queues for 10 seconds and 5 seconds are provided, and the state change notification is stored in the queue for 10 seconds when the state after change corresponds to "Run", and the state change notification is stored in the queue for 5 seconds when the state after change corresponds to "Down".

On the other hand, the first transmission unit 114 transmits, for each queue, state change notification that is stored in the queue, to the monitoring master server 100 at cache time intervals that are set to the queue (Step S33). For convenience of illustration, processing of the first transmission unit 114 is described in Step S33, but is executed asynchronously of the other processing in practice.

By executing such processing, notification speed to the monitoring master server 100 may be adjusted depending on an importance degree of state change notification so that the state change notification is immediately transferred to the monitoring master server 100, or state change notification is cached for a short time, or state change notification is cached for a long time.

Figure 14:
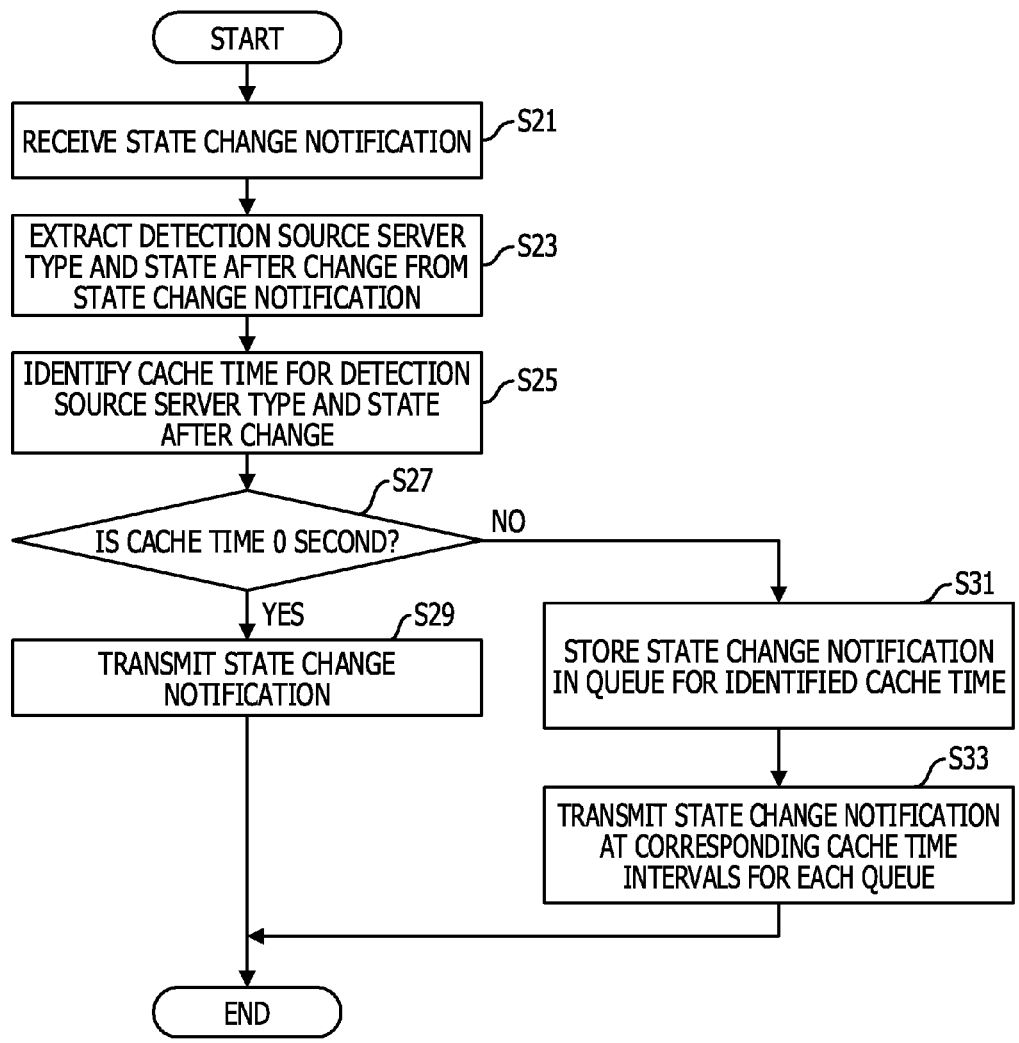
FIG. 14 is a diagram illustrating a processing flow in the monitoring sub-master server.

Processing that is basically similar to the processing illustrated in FIG. 14 is applied to pieces of processing of the second reception unit 116, the second distribution processing unit 117, the second queue group 118, and the second transmission unit 119 as well.

That is, when the second reception unit 116 receives state change notification from the monitoring master server 100 (Step S21), the second reception unit 116 outputs the state change notification to the second distribution processing unit 117. The second distribution processing unit 117 extracts a detection source server type and a state after change from the state change notification (Step S23), and identifies a cache time that is defined for the detection source server type and the state after change, from the data that is stored in the setting data storage unit 115 (Step S25).

In addition, the second distribution processing unit 117 determines whether or not the cache time corresponds to 0 second (Step S27). When second distribution processing unit 117 determines that the cache time corresponds to 0 second, the state change notification is transmitted without caching, so that the second distribution processing unit 117 outputs the received state change notification to the second transmission unit 119.

The second transmission unit 119 transmits the state change notification to the monitored server under the control of each of the monitoring sub-master servers 110 and 120 (Step S29). However, the state change notification from the monitoring master server 100 is supposed to be notified to the monitored server other than the server the state of which is the down state, so that, here, the state change notification is transmitted to the monitored server other than the server the state of which is the down state.

As a result, important state change notification is immediately transmitted to a further monitored server.

On the other hand, when the second distribution processing unit 117 determines that the cache time does not correspond to 0 second, the second distribution processing unit 117 stores the state change notification in a queue for the identified cache time in the second queue group 118 (Step S31). In the state change notification from the monitoring master server 100, the detection source server may be the file server, the management server, or the calculation server, so that a queue is provided for each of the cache times that are stored in the setting data storage unit 115.

In addition, in the monitoring sub-master server 120, when state change notification is received in which it is indicated the detection source server is the file server A, and the state after change is "Down", the state change notification is stored in a queue for 5 seconds.

On the other hand, the second transmission unit 119 transmits, for each of the queues, the state change notification that is stored in the queue, to the server other than the detection source server, from among the monitored servers under the control of each of the monitoring sub-master servers 110 and 120, at the cache time intervals that are set to the queue (Step S33). For convenience of illustration, processing of the second transmission unit 119 is described in Step S33, but is executed asynchronously of the other processing in practice.

By executing such processing, notification speed to the monitored server may be adjusted depending on an importance degree of state change notification so that the state change notification is immediately transferred to each of the monitored servers, or state change notification is cached for a short time, or state change notification is cached for a long time.

Figure 15:
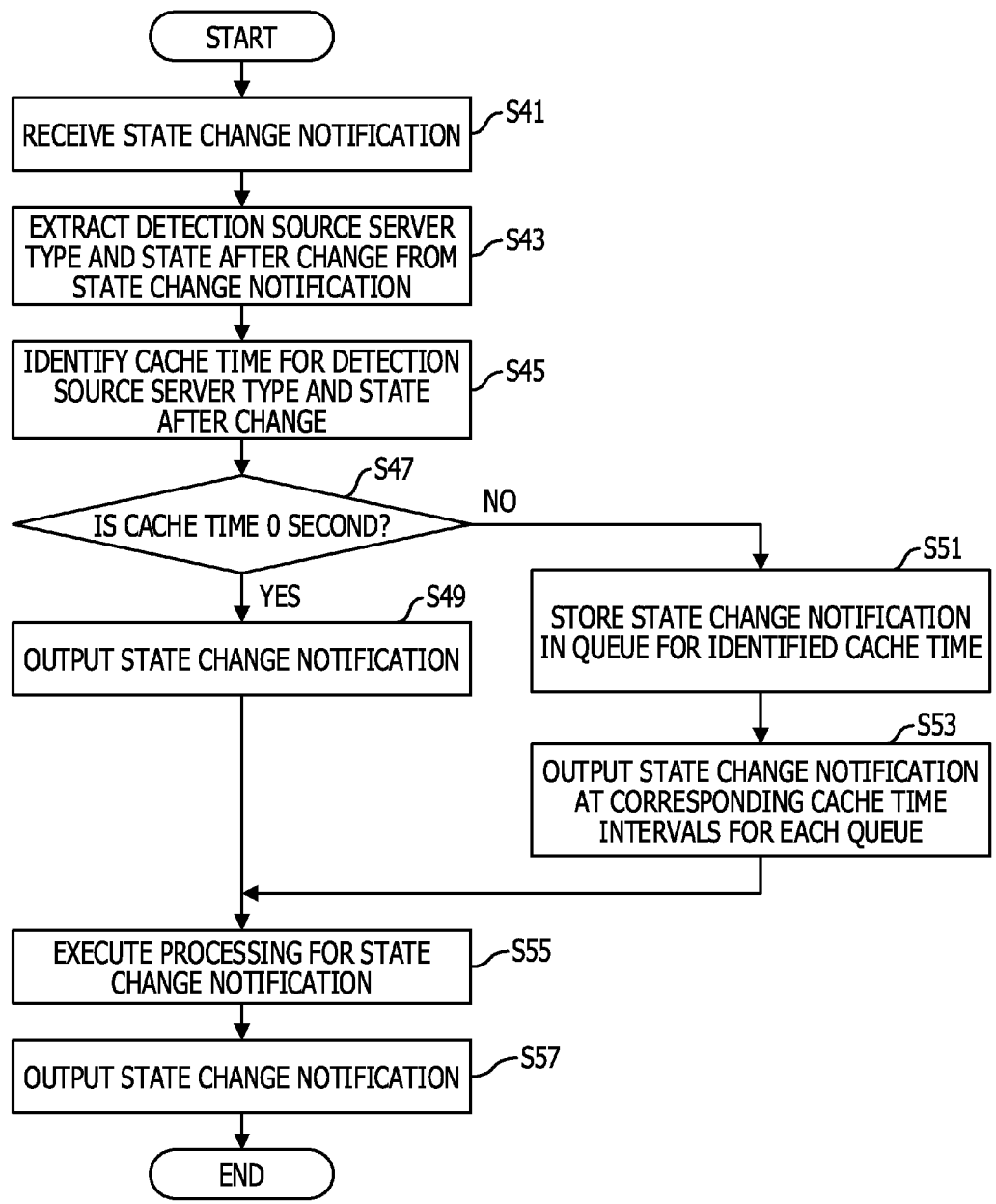
FIG. 15 is a diagram illustrating a processing flow in the monitoring master server.

The processing content of the monitoring master server 100 is described below with reference to FIG. 15.

When the reception unit 101 receives state change notification from the monitoring sub-master server 110 or 120 under the control of the monitoring master server 100 (Step S41), the reception unit 101 outputs the state change notification to the distribution processing unit 102. The distribution processing unit 102 extracts a detection source server type and a state after change from the state change notification (Step S43), and identifies a cache time that is defined for the detection source server type and the state after change, from the data that is stored in the setting data storage unit 105 (Step S45).

In addition, the distribution processing unit 102 determines whether or not the cache time corresponds to 0 second (Step S47). When the distribution processing unit 102 determines that the cache time corresponds to 0 second, the state change notification is output without caching, so that the distribution processing unit 102 outputs the received state change notification to the output unit 104.

The output unit 104 outputs the state change notification to the state management unit 130 (Step S49). As a result, important state change notification is immediately output to the state management unit 130. In addition, the processing proceeds to Step S55.

On the other hand, when the distribution processing unit 102 determines that the cache time does not correspond to 0 second, the distribution processing unit 102 stores the state change notification in a queue for the identified cache time in the queue group 103 (Step S51). The transmission source server of the state change notification may be the file server, the management server, or the calculation server, so that a queue is provided for each of the cache times that are stored in the setting data storage unit 105.

The state change notification is stored in a queue for 10 seconds when the state after change of the file server A is "Run", and the state change notification is stored in a queue for 5 seconds when the state after change of the file server A is "Down".

On the other hand, the output unit 104 transmits, for each of the queues, the state change notification that is stored in the queue, to the state management unit 130 at cache time intervals that are set to the queue (Step S53). For convenience of illustration, the processing of the output unit 104 is described in Step S53, but is performed asynchronously of the other processing in practice.

When the state management unit 130 receives the state change notification from the output unit 104, the state management unit 130 executes processing that is defined beforehand for the state change notification (Step S55). On the other hand, the state management unit 130 outputs the state change notification to the transmission unit 109 in order to notify the monitored server other than the server the state of which is the down state, of the state change notification (Step S57).

By executing such processing, notification speed to the state management unit 130 may be adjusted depending on an importance degree of state change notification so that the state change notification is immediately output to the state management unit 130, or state change notification is cached for a short time, or state change notification is cached for a long time.

For example, a case in which abnormality occurs and the state transitions to the down state in the file server A is described with reference to FIG. 16.

Even when abnormality occurs in the file server A after the point of 0 second of service monitoring, the service monitoring is not performed for 30 seconds, so that state change due to the abnormality is not detected. After 30 seconds elapses, the service monitoring unit 520 detects state change of the file server A to the down state, and causes the communication unit 510 to transmit state change notification to the monitoring sub-master server 110 (FIG. 16: 1101). When the monitoring sub-master server 110 receives the state change notification from the file server A, the monitoring sub-master server 110 identifies a cache time "5 seconds" from the detection source server type "file server" and the state after change "Down", and stores the cache time in a queue for 5 seconds (FIG. 16: 1102). After the cache time is stored in the queue for 5 seconds at maximum, the monitoring sub-master server 110 transmits the state change notification in the queue, to the monitoring master server 100 (FIG. 16: 1103).

Figure 16:
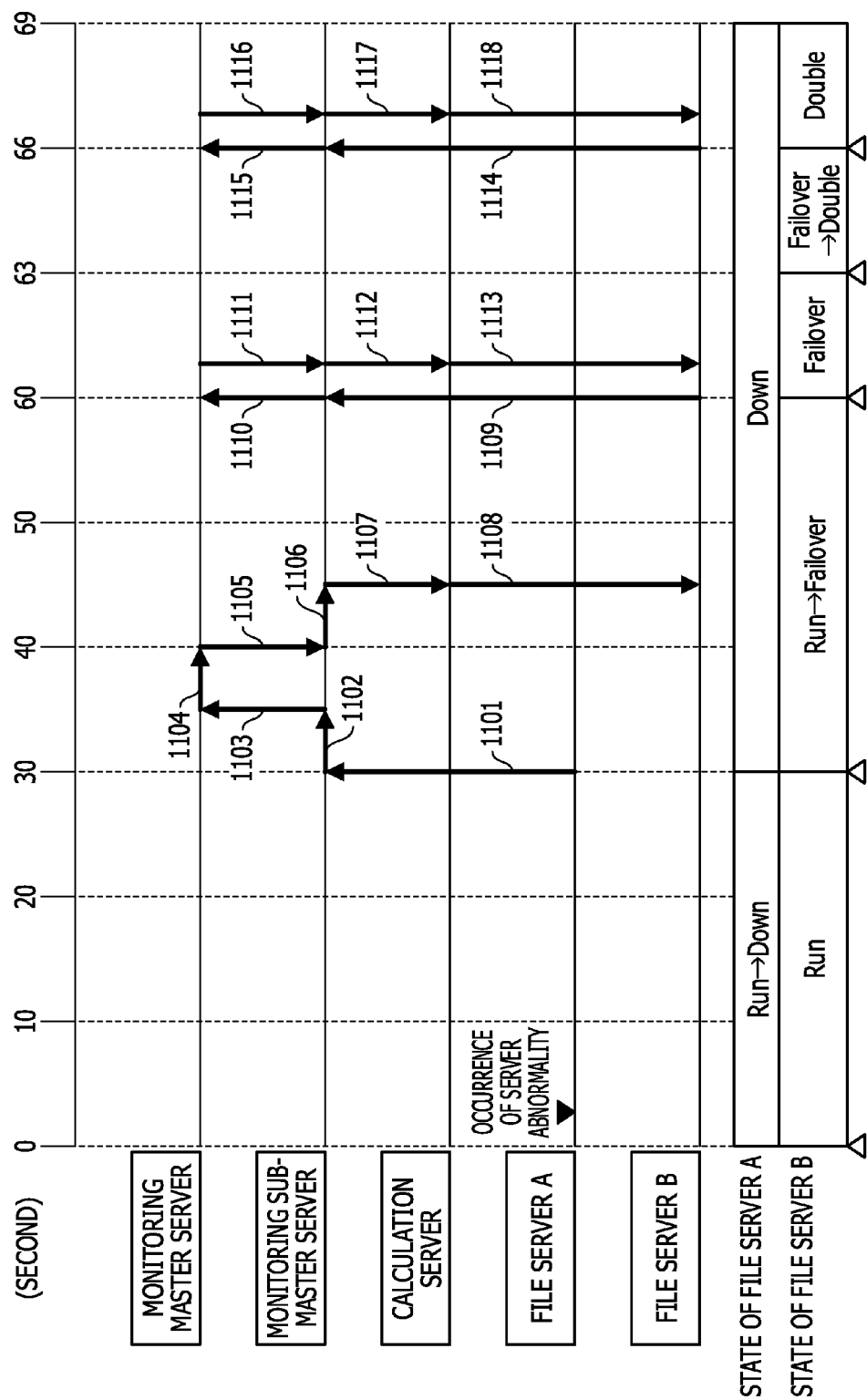
FIG. 16 is a diagram illustrating a processing example in the first embodiment.

When the monitoring master server 100 receives the state change notification, the monitoring master server 100 identifies the cache time "5 seconds" from the detection source server type "file server" and the state after change "Down" in the state change notification, and stores the cache time in the queue for 5 seconds (FIG. 16: 1104). After that, the monitoring master server 100 transmits the state change notification to the monitoring sub-master servers 110 and 120 under the control of the monitoring master server 100 in order to notify the other monitored servers of the state change notification (FIG. 16: 1105).

When each of the monitoring sub-master servers 110 and 120 receives the state change notification from the monitoring master server 100, similar to the above-described case, each of the monitoring sub-master servers 110 and 120 stores the state change notification in the queue for 5 seconds (FIG. 16: 1106). After that, each of the monitoring sub-master servers 110 and 120 transmits the state change notification to the monitored servers other than the file server A the state of which is the down state (FIG. 16: 1107 and 1108).

When the file server B receives such state change notification, the file server B recognizes that the file server A that is paired with the file server B as the failover pair transitions to the down state, and executes failover. However, service monitoring is performed still at 30 second intervals, so that the failover state is not detected until the time reaches the point of 60 seconds. When the time reaches the point of 60 seconds, and the service monitoring unit 520 of the file server B detects the failover state, the service monitoring unit 520 causes the communication unit 510 to transmit the state change notification to the monitoring sub-master server 110 (FIG. 16:1109).

When the monitoring sub-master server 110 receives the state change notification, the monitoring sub-master server 110 identifies a cache time "0 second" from the detection source server type "file server" and the state after change "Failover" in the state change notification, and immediately transmits the state change notification to the monitoring master server 100 as is (FIG. 16: 1110).

When the monitoring master server 100 receives the state change notification, the monitoring master server 100 identifies the cache time "0 second" from the detection source server type "file server" and the state after change "Failover" in the state change notification, so that the monitoring master server 100 outputs the state change notification to the state management unit 130 as is. In addition, the monitoring master server 100 transmits the state change notification to the monitoring sub-master servers 110 and 120 under the control of the monitoring master server 100 in order to notify the other monitored servers of the state change notification (FIG. 16: 1111).

When each of the monitoring sub-master servers 110 and 120 receives the state change notification from the monitoring master server 100, similar to the above-described case, each of the monitoring sub-master servers 110 and 120 transmits the state change notification to the monitored servers other than the file server A the state of which is the down state (FIG. 16: 1112 and 1113).

The monitored server other than the file servers A and B recognizes that failover occurs, and requests a file from the file server B.

On the other hand, when the file server B recognizes that failover is notified to the other monitored servers and the like, the state transitions to the "Double" state. The service monitoring unit 520 of the file server B proceeds from monitoring at 30 second intervals to monitoring at 3 second intervals, so that state change is detected in service monitoring for 63 seconds as long as the state transitions to "Double" state within 63 seconds. In this example, the example is described in which it is not detected that the state transitions to "Double" state within 63 seconds because the processing is delayed.

The service monitoring unit 520 of the file server B detects state change to "Double" state at the point of 66 seconds, and causes the communication unit 510 to transmit the state change notification to the monitoring sub-master server 110 (FIG. 16: 1114).

When the monitoring sub-master server 110 receives the state change notification, the monitoring sub-master server 110 identifies a cache time "0 second" from the detection source server type "file server" and the state after change "Double" in the state change notification, and immediately transmits the state change notification to the monitoring master server 100 as is (FIG. 16: 1115).

When the monitoring master server 100 receives the state change notification, the monitoring master server 100 identifies a cache time "0 second" from the detection source server type "file server" and the state after change "Double" in the state change notification, so that the monitoring master server 100 immediately outputs the state change notification to the state management unit 130 as is. In addition, the monitoring master server 100 transmits the state change notification to the monitoring sub-master servers 110 and 120 under the control of the monitoring master server 100 in order to notify the monitored servers other than the monitored server the state of which is the down state, of the state change notification (FIG. 16: 1116).

When each of the monitoring sub-master servers 110 and 120 receives the state change notification from the monitoring master server 100, similar to the above-described case, each of the monitoring sub-master servers 110 and 120 transmits the state change notification to the monitored servers other than the file server A the state of which is the down state (FIG. 16: 1117 and 1118).

By executing the above-described processing, state change may be notified to the other monitored servers and the like at speed depending on an importance degree of the state change.

When the state of the calculation server 210 or 220 transitions to the down state, distribution of state change notification as illustrated in 1101 to 1108 of FIG. 16 is performed, and notification of such a down state is completed. This is why failover does not occur.

In addition, when the state of the management server 230 transitions to the down state, similar to FIG. 16, distribution of state change notification is performed three times, but the state finally transitions to "Run" and not "Double", so that a cache time is not 0 second but increased as illustrated in FIG. 16. In the above-described example, in the monitoring sub-master servers 110 and 120 and the monitoring master server 100, a cache time of 20 seconds is identified. This is why there is no influence on job execution of the calculation servers 210 and 220 even when the state of the management server 230 transitions to the down state.

As described above, assignment of urgency of the notification is performed depending on an importance degree of state change that is notified by state change notification, or a degree of influence on the other servers.

Second Embodiment

State change notification cache is performed in order to avoid that a large amount of state change notification flows through a network of the information processing system for a short time, but when the number of monitored servers is small, a communication load in the network may be suppressed. In addition, similarly, even when the number of monitored servers is large, a communication load in the network may be suppressed as long as the number of monitored servers the states of which correspond to the down state is large or the number of monitored servers that are in operation is small.

Figure 17:
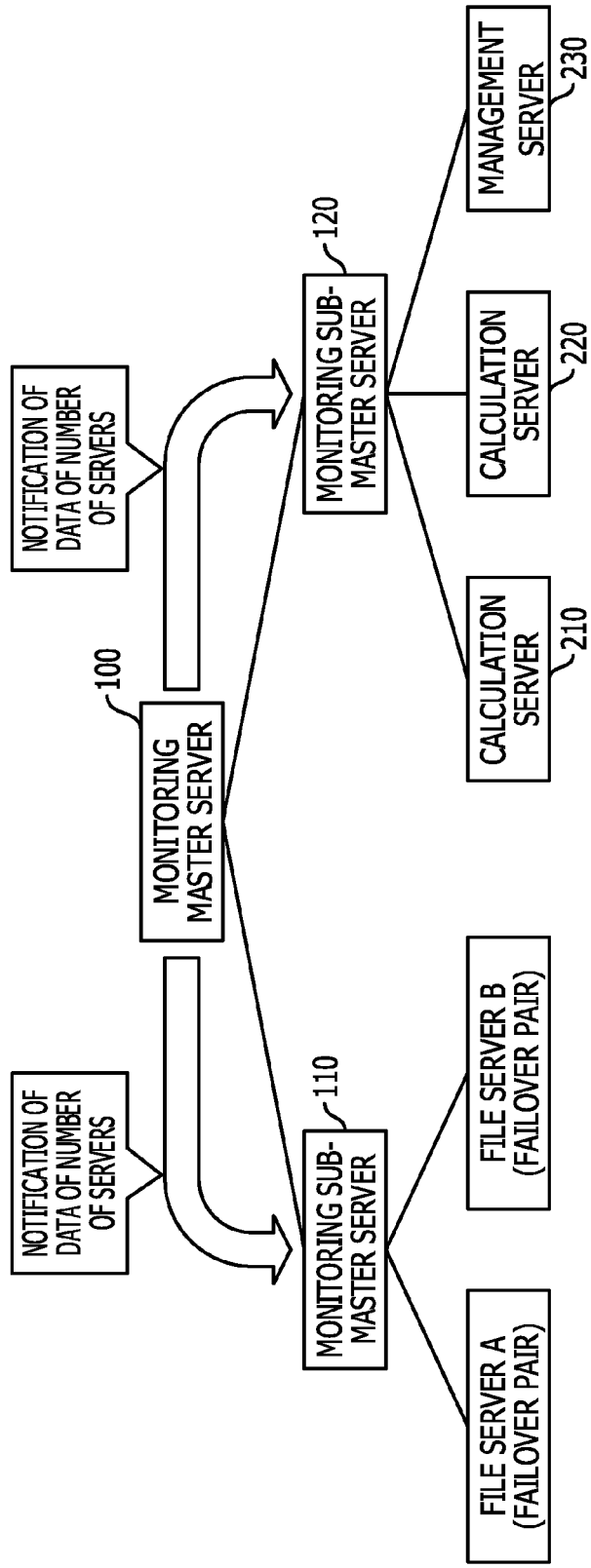
FIG. 17 is a diagram illustrating a second embodiment.

Thus, in the embodiment, as schematically illustrated in FIG. 17, data that includes the number of monitored servers under the control of the monitoring master server 100, the number of monitored servers that are in operation, or the number of monitored servers the states of which correspond to the down state, which is grasped by the state management unit 130 of the monitoring master server 100, is notified to the monitoring sub-master servers 110 and 120, for example, periodically or at a certain timing.

Figure 18:
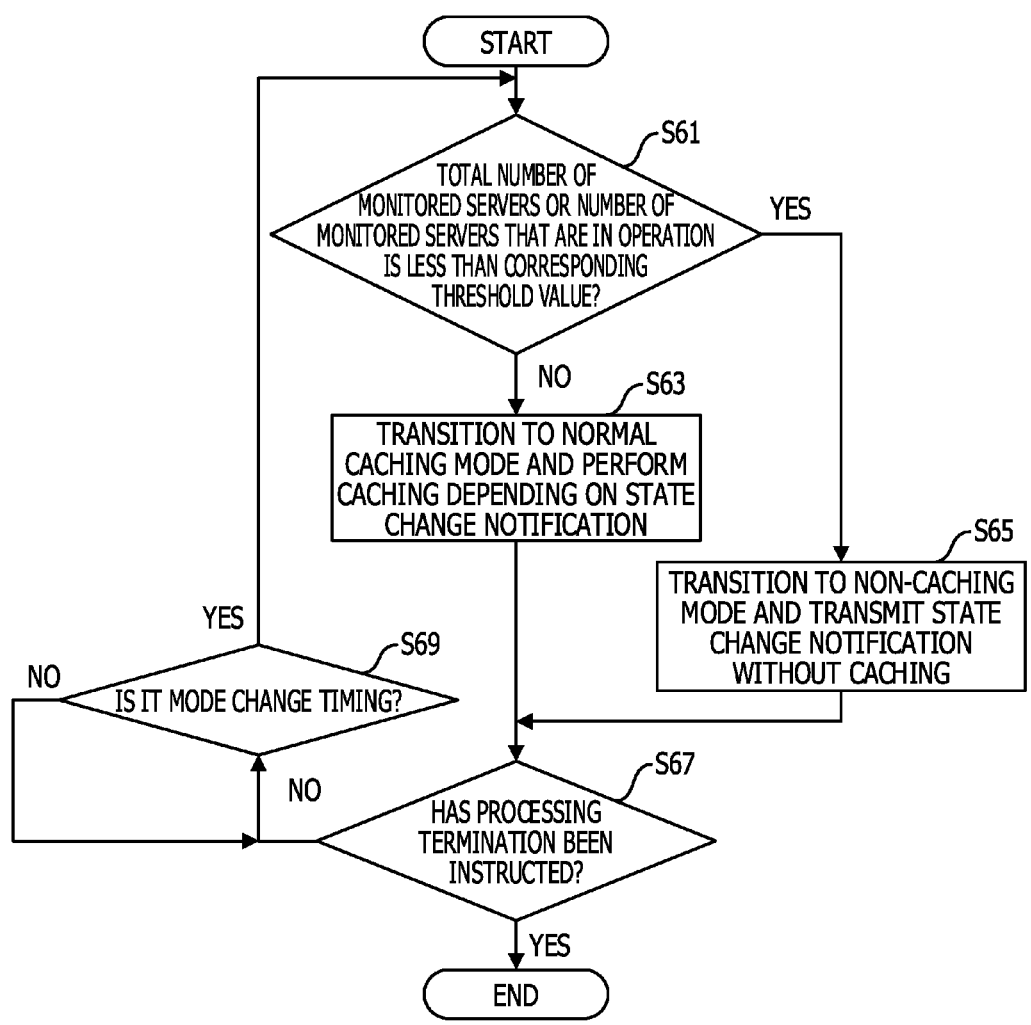
FIG. 18 is a diagram illustrating a processing flow in the second embodiment.

For example, each of the monitoring master server 100, and the monitoring sub-master servers 110 and 120 may execute processing as illustrated in FIG. 18 based on such data of the number of servers.

That is, each of the monitoring master server 100, and the monitoring sub-master servers 110 and 120 determines whether or not the total number of monitored servers or the number of monitored servers that are in operation is less than a corresponding threshold value (Step S61). The determination may be performed based on the number of monitored servers the states of which corresponds to the down state, but in this case, it is determined whether or not the number of monitored servers the states of which corresponds to the down state is a corresponding threshold value or more.

When the condition in Step S61 is satisfied, the mode of each of the monitoring master server 100, and the monitoring sub-master servers 110 and 120 transitions to a non-caching mode, and transmission or output of state change notification is performed without caching (Step S65). In addition, the processing proceeds to Step S67.

On the other hand, when the condition in Step S61 is not satisfied, the mode of each of the monitoring master server 100, and the monitoring sub-master servers 110 and 120 transitions to a normal caching mode, and performs caching depending on state change notification as described in the first embodiment (Step S63).

In addition, each of the monitoring master server 100, and the monitoring sub-master servers 110 and 120 determines whether or not processing termination has been instructed (Step S67), and when the processing termination has been instructed, the processing ends. On the other hand, when the processing termination has not been instructed, each of the monitoring master server 100, and the monitoring sub-master servers 110 and 120 determines whether or not mode change timing has been reached (Step S69). For example, the mode change timing is set by timing that is instructed from the monitoring master server 100 or periodical timing.

When the mode change timing has not been reached yet, the processing returns to Step S69. On the other hand, the mode change timing has been reached, in the monitoring master server 100, and each of the monitoring sub-master servers 110 and 120, the processing returns to Step S61.

As a result, in a state in which it is assumed that a communication load in the network of the information processing system is low, state change notification cache is not performed, and in a state in which it is assumed that the communication load is higher than a usual amount, a cache time is set depending on state change notification as described in the first embodiment.

The embodiments that are related to the information processing system, the method of controlling the information processing system, and the control program of the management device are described above, but the embodiments discussed herein are not limited to such embodiments. For example, each of the functional block diagrams in FIG. 4 to FIG. 6 is merely an example, and may not correspond to the program module structure and the data storage unit structure.

In the processing flow, processing order of steps may be changed, steps may be performed in parallel as long as a processing result is not changed.

Figure 19:
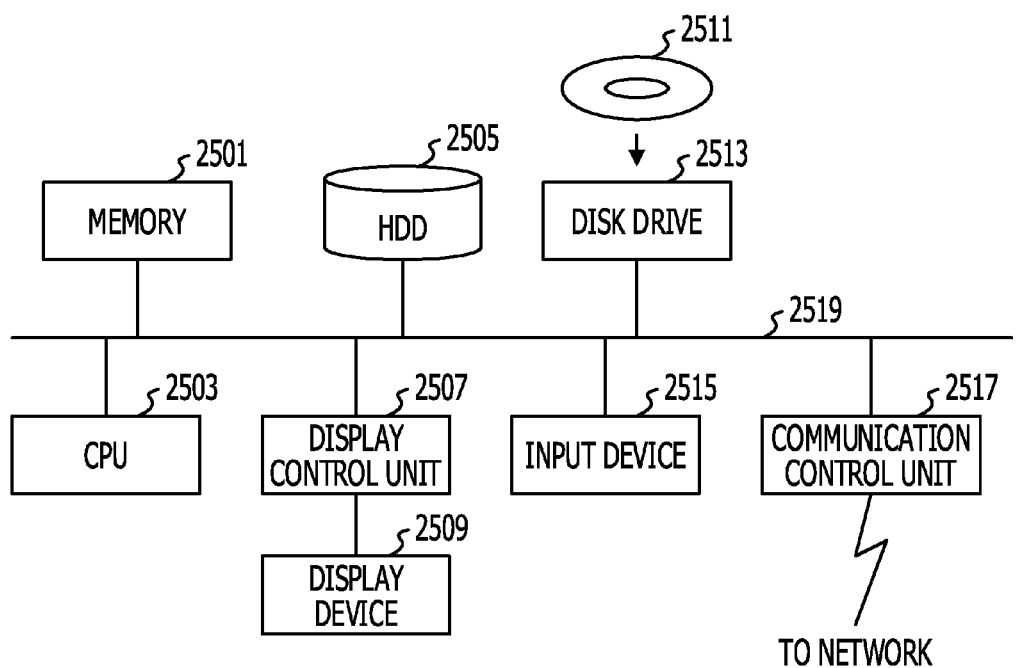
FIG. 19 is a functional block diagram of a computer.

The above-described various servers are computer devices, and as illustrated in FIG. 19, a memory 2501, a central processing unit (CPU) 2503, a hard disk drive (HDD) 2505, a display control unit 2507 that is connected to a display device 2509, a drive device 2513 for a removable disk 2511, an input device 2515, and a communication control unit 2517 that is used to be connected to a network are connected to each other through a bus 2519. An operating system (OS) and an application program that is used to execute the processing in the embodiment are stored in the HDD 2505, and are read from the HDD 2505 to the memory 2501 when the OS and the application program are executed by the CPU 2503. The CPU 2503 controls the display control unit 2507, the communication control unit 2517, and the drive device 2513 in accordance with a processing content of the application program to cause the display control unit 2507, the communication control unit 2517, and the drive device 2513 to perform a certain operation. In addition, data in the middle of processing is merely stored in the memory 2501, but may be stored in the HDD 2505. In the embodiments, the application program that is used to execute the above-described processing is distributed so as to be stored in the computer-readable removable disk 2511, and installed from the drive device 2513 to the HDD 2505. The application program may be installed into the HDD 2505 through a network such as the Internet and the communication control unit 2517. Such a computer device achieves the above-described various functions when the hardware such as the CPU 2503 and the memory 2501, and the program such as the OS and the application program cooperate with each other organically.

The above-described embodiments are summarized as follows.

The information processing system according to the embodiment includes, for example, a first management device that is a monitoring master server, a second management device that is, for example, a monitoring sub-master server under the control of the first management device, and a plurality of information processing devices under the control of the second management device. In addition, when the above-described second management device receives state change notification of the information processing device from one of the plurality of information processing devices, the state change notification is transmitted to first management device after caching is performed depending on a time that is defined beforehand so as to correspond to the state after change in the state change notification.

As long as a cache time is defined appropriately for each state after change, state change of the information processing device that is included in the information processing system may be notified depending on the state change flexibly. The cache time includes "0".

In addition, the above-described second management device may perform caching depending on a time that is defied beforehand so as to further correspond to the type of the information processing device that is a detection source of state change that is indicated by the received state change notification. This is why importance and a degree of influence on the other information processing devices are different depending on the type of the information processing device.

In addition, when the above-described second management device receives state change notification that is used to notify a certain information processing device of state change, from the first management device, the state change notification may be transmitted to an information processing device the state of which is other than a down state, from among the plurality of information processing devices after caching is performed depending on a time that is defined beforehand so as to correspond to the state after change of the certain information processing device and the type of the certain information processing device.

As a result, the information processing device may also execute processing depending on state change that occurs in a further information processing device.

In addition, when each of the above-described plurality of information processing devices detects change in the state of the information processing device, the information processing device may perform setting so that monitoring of the information processing device is performed at time intervals that are set beforehand so as to correspond to the state after change. This is why it may be desirable that state change notification is transmitted frequently depending on the state after change.

In addition, when the above-described first management device receives state change notification from the second management device, the first management device may execute processing of the state change notification after caching is performed depending on a time that is defined beforehand so as to correspond to the state after change that is indicated by the state change notification.

In addition, when the number of the plurality of information processing devices or the number of information processing devices that are in operation from among the plurality of information processing devices is a threshold value or more, the above-described second management device may perform caching of the state change notification. This considers a communication load in a network of the information processing system.

A program that is used to cause a computer to execute the above-described processing may be created, and the program is stored, for example, in an optical disk such as a flexible disk, a compact disk read only memory (CD-ROM), a semiconductor memory such as a magneto-optical disk or a ROM, a computer-readable storage medium such as a hardware disk, or a storage device. Data in the middle of processing is temporarily stored in a storage device such as a random access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a first management device;
a second management device coupled to the first management device; and
a first information processing device and a second information processing device coupled to the second management device,
wherein the second management device configured to:
receive, from the first information processing device, a notification indicating a first state or a second state as an operation state of the first information processing device,
transmit the notification to the first management device after a time period has elapsed after the notification is received, the time period being changeable according to whether the notification indicates the first state or the second state as the operation state of the first information processing device, and
store information associating a plurality of values of the time period with a plurality of operation states of the first information processing device, respectively, and
select one of the plurality of values when the notification indicates the first state and select another one of the plurality of values when the notification indicates the second state,
the first management device is configured to transmit the notification to the second management device after receiving the notification,
the second management device is configured to transmit the notification received from the first management device to the second information processing device after receiving the notification from the first management device, and
wherein the time period for the transmission of the notification while the first information processing device is in the second state and the first information processing device is down is shorter than while the first information processing device is in the second state and the first information processing device is running.

2. The information processing system according to claim 1, wherein the notification includes state information that indicates the second state, and type information that indicates a type of the first information processing device, and the time period is defined based on the state information and the type information.

3. The information processing system according to claim 1, wherein the time period to transmit the notification from the second management device to the first management device is a first time period, and the second management device transmits the notification after a second time period that is defined based on the second state.

4. The information processing system according to claim 3, wherein the first state is a running state, and the second state is a down state, and the second information processing device is in the first state when the second information processing device receives the notification from the second management device.

5. The information processing system according to claim 4, wherein the second information processing device executes failover process after the second information processing device receives the notification.

6. The information processing system according to claim 2, wherein the first information processing device is a server, and the type information indicates that the type of the first information processing device corresponds to at least one of a file server, a calculation server, and a management server.

7. The information processing system according to claim 1, wherein the first information processing device detects the operation state of the first information processing device at first time intervals that are set based on the second state after the operation state of the first information processing device is changed from the first state to the second state.

8. The information processing system according to claim 2, wherein the time period to transmit the notification to the first management device is a first time period, and the second management device transmits the notification after a second time period, and the first management device receives the notification from the second management device, and transmits the notification to the second management device after a third time period has elapsed after receiving the notification, the third time period being defined based on the second state.

9. The information processing system according to claim 1, wherein the information processing system includes a plurality of information processing devices which includes the first information processing device and the second information processing device, when a number of the plurality of information processing devices or a number of information processing devices that are in a running state among the plurality of information processing devices is equal to a threshold value or more, the second management device transmits the notification to the first management device after the time period has elapsed after receiving the notification.

10. The information processing system according to claim 1, wherein the first management device and the second management device are servers.

11. A control method of an information processing system that includes a first management device, a second management device coupled to the first management device, and a first information processing device and a second information processing device coupled to the second management device, the method comprising:

transmitting a notification indicating a first state or a second state as an operation state of the first information processing device, from the first information processing device to the second management device; and transmitting the notification, from the second management device to the first management device, after a time period has elapsed after the second information processing device receives the notification, the time period being changeable according to whether the notification indicates the first state or the second state as the operation state of the first information processing device, and the second management device storing information associating a plurality of values of the time period with a plurality of operation states of the first information processing device, respectively, and selecting one of the plurality of values when the notification indicates the first state and select another one of the plurality of values when the notification indicates the second state, wherein the first management device transmits the notification to the second management device after receiving the notification, the second management device transmits the notification received from the first management device to the second information processing device after receiving the notification from the first management device, and wherein the time period for the transmitting of the notification while the first information processing device is in the second state and the first information processing device is down is shorter than while the first information processing device is in the second state and is running.

12. The control method according to claim 11, wherein the notification includes state information that indicates the second state, and type information that indicates a type of the first information processing device, and the time period is defined based on the state information and the type information.

13. The control method according to claim 11, wherein the time period to transmit the notification from the second management device to the first management device is a first time period, and the second management device transmits the notification after a second time period that is defined based on the second state.

14. The control method according to claim 13, wherein the first state is a running state, and the second state is a down state, and the second information processing device is in the first state when the second information processing device receives the notification from the second management device.

15. The control method according to claim 14, further comprising:

executing failover process with the second information processing device after the second information processing device receives the notification.

16. The control method according to claim 12, wherein
the first information processing device is a server, and
the type information indicates that the type of the first information processing device corresponds to at least one of a file server, a calculation server, and a management server.

17. The control method according to claim 11, further comprising:
detecting the operation state of the first information processing device at first time intervals that are set based on the second state after the operation state of the first information processing device is changed from the first state to the second state.

18. A non-transitory computer-readable storage medium storing a control program that causes an information processing system to execute a process, the information processing system including a first management device, a second management device coupled to the first management device, and a first information processing device and a second information processing device coupled to the second management device, the process comprising:
transmitting, a notification indicating a first state or a second state as an operation state of the first information processing device, from the first information processing device to the second management device; and
transmitting the notification, from the second management device to the first management device, after a time period has elapsed after the second information processing device receives the notification, the time period being changeable according to whether the notification indicates the first state or the second state as the operation state of the first information processing device, and the second management device storing information associating a plurality of values of the time period with a plurality of operation states of the first information processing device, respectively, and selecting one of the plurality of values when the notification indicates the first state and select another one of the plurality of values when the notification indicates the second state,
wherein the first management device transmits the notification to the second management device after receiving the notification,
the second management device transmits the notification received from the first management device to the second information processing device after receiving the notification from the first management device, and
wherein the time period for the transmitting of the notification while the first information processing device is in the second state and the first information processing device is down is shorter than while the first information processing device is in the second state and is running.

19. The information processing system according to claim 1, wherein
the information processing system includes a plurality of information processing devices including the first information processing device and the second information processing device, and
the time period is set so as to reduce a peak load of a network including the first management device, the second management device and the plurality of information processing devices.

* * * * *